US011522686B2

(12) United States Patent
Peddada et al.

(10) Patent No.: US 11,522,686 B2
(45) Date of Patent: Dec. 6, 2022

(54) SECURING DATA USING KEY AGREEMENT

(71) Applicant: salesforce.com, inc., San Francisco, CA (US)

(72) Inventors: Prasad Peddada, Alameda, CA (US); Taher Elgamal, San Francisco, CA (US); Aaron Johnson, Bentonville, AR (US); Ryan Guest, Stockton, CA (US)

(73) Assignee: Salesforce, Inc., San Francisco, CA (US)

( * ) Notice: Subject to any disclaimer, the term of this patent is extended or adjusted under 35 U.S.C. 154(b) by 102 days.

(21) Appl. No.: 16/931,226

(22) Filed: Jul. 16, 2020

(65) Prior Publication Data

US 2022/0021525 A1   Jan. 20, 2022

(51) Int. Cl.
*H04L 9/08* (2006.01)
*H04L 9/30* (2006.01)

(52) U.S. Cl.
CPC .......... *H04L 9/0841* (2013.01); *H04L 9/0825* (2013.01); *H04L 9/0897* (2013.01); *H04L 9/3066* (2013.01)

(58) Field of Classification Search
CPC ... H04L 9/0841; H04L 9/0825; H04L 9/0897; H04L 9/3066
USPC ........................................................ 713/171
See application file for complete search history.

(56) References Cited

U.S. PATENT DOCUMENTS

| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |

(Continued)

FOREIGN PATENT DOCUMENTS

| CN | 102523086 A | 6/2012 |
| JP | H11-239124 A | 3/2001 |

(Continued)

OTHER PUBLICATIONS

Buchade et al., "Key Management for Cloud Data Storage: Methods and Comparisons", IEEE, doi: 10.1109/ACCT.2014.78, 2014, pp. 263-270. (Year: 2014).*

(Continued)

*Primary Examiner* — Peter C Shaw
(74) *Attorney, Agent, or Firm* — Dergosits & Noah LLP; Todd A. Noah

(57) ABSTRACT

Methods and systems for securing customer data in a multi-tenant database environment are described. A key identifier received from a security server may be stored by an application server. The key identifier may be associated with a private key that is accessible by the security server and not accessible by the application server. A request to derive a symmetric key may be transmitted from the application server to the security server, the request including a public key generated by the application server, a salt value, and the key identifier. The symmetric key may then be derived based on the transmitted public key and the private key using a key derivation function. The application server may then receive and store the symmetric key in an in-memory cache, and be used to securely encrypt data received by the application server from client devices.

18 Claims, 15 Drawing Sheets

(56) References Cited

U.S. PATENT DOCUMENTS

| | | |
|---|---|---|
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,058,807 B2 | 6/2006 | Grawock et al. |
| 7,062,502 B1 | 6/2006 | Kesler |
| 7,146,009 B2 | 12/2006 | Andivahis et al. |
| 7,231,516 B1 | 6/2007 | Sparrell et al. |
| 7,340,411 B2 | 3/2008 | Cook |
| 7,356,482 B2 | 4/2008 | Frankland et al. |
| 7,360,091 B2 | 4/2008 | Aikawa et al. |
| 7,380,125 B2 | 5/2008 | Di Luoffo et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,290,165 B2 | 10/2012 | Allen et al. |
| 8,302,172 B2 | 10/2012 | Grandcolas et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,572,673 B2 | 10/2013 | Duffy |
| 8,646,103 B2 | 2/2014 | Jakobson et al. |
| 8,650,625 B2 | 2/2014 | Grandcolas et al. |
| 8,892,908 B2 | 11/2014 | Lieber et al. |
| 8,897,446 B2 | 11/2014 | Bichler et al. |
| 9,106,411 B2 | 8/2015 | De Atley et al. |
| 9,165,158 B2 | 10/2015 | Li et al. |
| 9,204,297 B2 | 12/2015 | Morioka |
| 9,892,460 B1 | 2/2018 | Winklevoss et al. |
| 11,184,169 B1* | 11/2021 | Sokolov ............... H04L 9/0894 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0090085 A1* | 7/2002 | Vanstone ............... H04L 9/0869 |
| | | 380/44 |
| 2002/0126850 A1 | 9/2002 | Allen et al. |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0039925 A1 | 2/2004 | McMillan et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0220134 A1* | 9/2007 | Cameron ............... H04L 67/02 |
| | | 709/224 |
| 2007/0263872 A1 | 11/2007 | Kirkup et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0150341 A1 | 6/2010 | Dodgson et al. |
| 2011/0252243 A1 | 10/2011 | Brouwer et al. |
| 2011/0261964 A1* | 10/2011 | Kahler ............... H04L 9/083 |
| | | 380/44 |

(56) References Cited

U.S. PATENT DOCUMENTS

| | | | |
|---|---|---|---|
| 2012/0137359 A1 | 5/2012 | Szabo | |
| 2012/0233137 A1 | 9/2012 | Jakobson et al. | |
| 2013/0080768 A1* | 3/2013 | Lagerway | H04L 9/321 713/176 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0275744 A1 | 10/2013 | Resch | |
| 2014/0079076 A1 | 3/2014 | Kamble et al. | |
| 2014/0101447 A1* | 4/2014 | Lekies | H04L 9/0841 713/169 |
| 2014/0205089 A1 | 7/2014 | Irwin | |
| 2014/0359291 A1 | 12/2014 | Wilson et al. | |
| 2014/0359537 A1 | 12/2014 | Jakobson et al. | |
| 2015/0003474 A1 | 1/2015 | Thomas et al. | |
| 2015/0007050 A1 | 1/2015 | Jakobson et al. | |
| 2015/0019442 A1* | 1/2015 | Hird | H04L 63/062 705/71 |
| 2015/0052369 A1 | 2/2015 | Koning et al. | |
| 2015/0095162 A1 | 4/2015 | Jakobson et al. | |
| 2015/0172563 A1 | 6/2015 | Jakobson et al. | |
| 2015/0288514 A1* | 10/2015 | Pahl | H04L 63/166 713/171 |
| 2015/0304110 A1* | 10/2015 | Oberheide | H04L 63/12 713/155 |
| 2016/0044001 A1 | 2/2016 | Pogorelik et al. | |
| 2016/0087950 A1 | 3/2016 | Barbir et al. | |
| 2016/0212109 A1 | 7/2016 | Hird | |
| 2016/0294553 A1 | 10/2016 | Hattori et al. | |
| 2016/0350535 A1* | 12/2016 | Garcia | G06F 21/575 |
| 2018/0048464 A1* | 2/2018 | Lim | H04L 9/0894 |
| 2019/0215164 A1* | 7/2019 | Hamann | H04L 9/0894 |
| 2019/0229908 A1 | 7/2019 | Peddada et al. | |
| 2021/0320947 A1* | 10/2021 | Moridi | H04L 63/102 |
| 2021/0377044 A1* | 12/2021 | Leibmann | H04L 9/0891 |

FOREIGN PATENT DOCUMENTS

| | | |
|---|---|---|
| JP | 2001-339543 A | 12/2001 |
| JP | 2002-084269 A | 3/2002 |
| JP | 2004-062556 A | 2/2004 |
| JP | 2009-017294 A | 1/2009 |
| JP | 2013-225942 A | 10/2013 |
| WO | 20140042701 A1 | 3/2014 |

OTHER PUBLICATIONS

Fakhar et al., "Management of Symmetric Cryptographic Keys in cloud based environment," 2013 15th International Conference on Advanced Communications Technology (ICACT), 2013, pp. 39-44. (Year: 2013).*

Lei et al., "Research on Key Management Infrastructure in Cloud Computing Environment", IEEE, doi: 10.1109/GCC.2010.84, 2010, pp. 404-407. (Year: 2010).*

Schiefer et al., "Security in a Distributed Key Management Approach", IEEE, doi: 10.1109/CBMS.2017.151, 2017, pp. 816-821. (Year: 2017).*

Oli et al., "A framework for key management for data confidentiality in cloud environment", IEEE, doi: 10.1109/ICCCI.2015.7218116, 2015, pp. 1-4. (Year: 2015).*

Nimbhorkar et al., "Exploration of Schemes for Authenticated Key Agreement Protocol Based on Elliptic Curve Cryptosystem," 2013 6th International Conference on Emerging Trends in Engineering and Technology, 2013, pp. 134-135. (Year: 2013).*

Schmid et al., "Implementing identity-based key agreement in embedded devices," 2015 International Conference on Pervasive and Embedded Computing and Communication Systems (PECCS), 2015, pp. 1-7. (Year: 2015).*

Lamba et al., "An Efficient Elliptic Curve Digital Signature Algorithm (ECDSA)," 2013 International Conference on Machine Intelligence and Research Advancement, 2013, pp. 179-183, doi: 10.1109/ICMIRA.2013.41. (Year: 2013).*

Koppl et al., "Application of Cryptography Based on Elliptic Curves," 2021 2nd International Conference on Electronics, Communications and Information Technology (CECIT), 2021, pp. 268-272, doi: 10.1109/CECIT53797.2021.00054. (Year: 2021).*

Office Action from related Japanese Patent Application No. 2017546194, dated Sep. 3, 2019.

International Search Report and Written Opinion from corresponding International Patent Application No. PCT/US2020/066957, dated Apr. 12, 2021.

Armnecht et al., "Transparent Data Deduplication in the Cloud," Proceedings of the 22nd ACM SigSac Conference an Computer and Communications Security, CCS '15, Jan. 1, 2015, New York, New York.

International Search Report and Written Opinion for related International Patent Application No. PCT/US2016/013257, dated Mar. 14, 2016.

* cited by examiner

| Tenant ID | Public Key | Key Server Key ID | Salt |
|---|---|---|---|
| 00D0000000000001 | Public Key 1 | Key 3 | 0x 10 2F 30 DF... |
| 00D0000000000001 | Public Key 2 | Key 7 | 0x 23 FF 4E 7A.. |
| 00D0000000000002 | Public Key 3 | Key 10 | 0x 49 64 59 FF. |
| 00D0000000000001 | Public Key 4 | Key 25 | 0x 9A f3 4C 42.. |

FIG. 10

| Tenant ID | Public Key | Key Server Key ID | Salt |
|---|---|---|---|
| 00D0000000000000001 | Public Key1 | Key 3 | 0x 10 2F 30 DF... |
| 00D0000000000000001 | | Key 7 | |
| 00D0000000000000002 | Public Key 3 | Key 10 | 0x 49 64 59 FF. |
| 00D0000000000000001 | Public Key 4 | Key 25 | 0x 9A f3 4C 42.. |

FIG. 11

SECURING DATA USING KEY AGREEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing, and more specifically relates to encrypting and decrypting data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

Existing approaches for securing data (such as customer data) stored in a storage area (e.g., database, data stores, etc.) may be based on asymmetric or symmetric cryptography. With asymmetric cryptography, a pair of keys—a public key and a private key—is used. The customer data can be encrypted using the public key and decrypted using the corresponding private key. Typically, it is very slow to encrypt data using the public key of an asymmetric key pair. Instead an acceptable practice is to encrypt data using a symmetric key. The symmetric key itself is encrypted with the public key thereby overcoming performance problems of asymmetric key cryptography.

BRIEF SUMMARY

Methods and systems for securing customer data in a multi-tenant database environment are described. A key identifier received from a security server over a network connection may be stored by an application server. The key identifier may be associated with a private key, where the private key is accessible by the security server and not accessible by the application server. The application server may also be in communication with a plurality of client devices over a network. A request to derive a symmetric key may be transmitted from the application server to the security server. The request may be transmitted after the application server stores the key identifier, and may include a public key generated by the application server, a salt value, and the key identifier. The symmetric key may then be derived by the security server based on the transmitted public key and the private key using a key derivation function and transmitted to the application server. The application server may then store the symmetric key in an in-memory cache of the application server, and be used to encrypt data received from one of the plurality of client devices.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

FIG. 10 shows an example data structure storing a rotated symmetric key for a client in a multitenant environment, in accordance with various embodiments.

FIG. 11 shows an example data structure displaying destruction of a symmetric key, in accordance with various embodiments.

DETAILED DESCRIPTION

Figure 1:
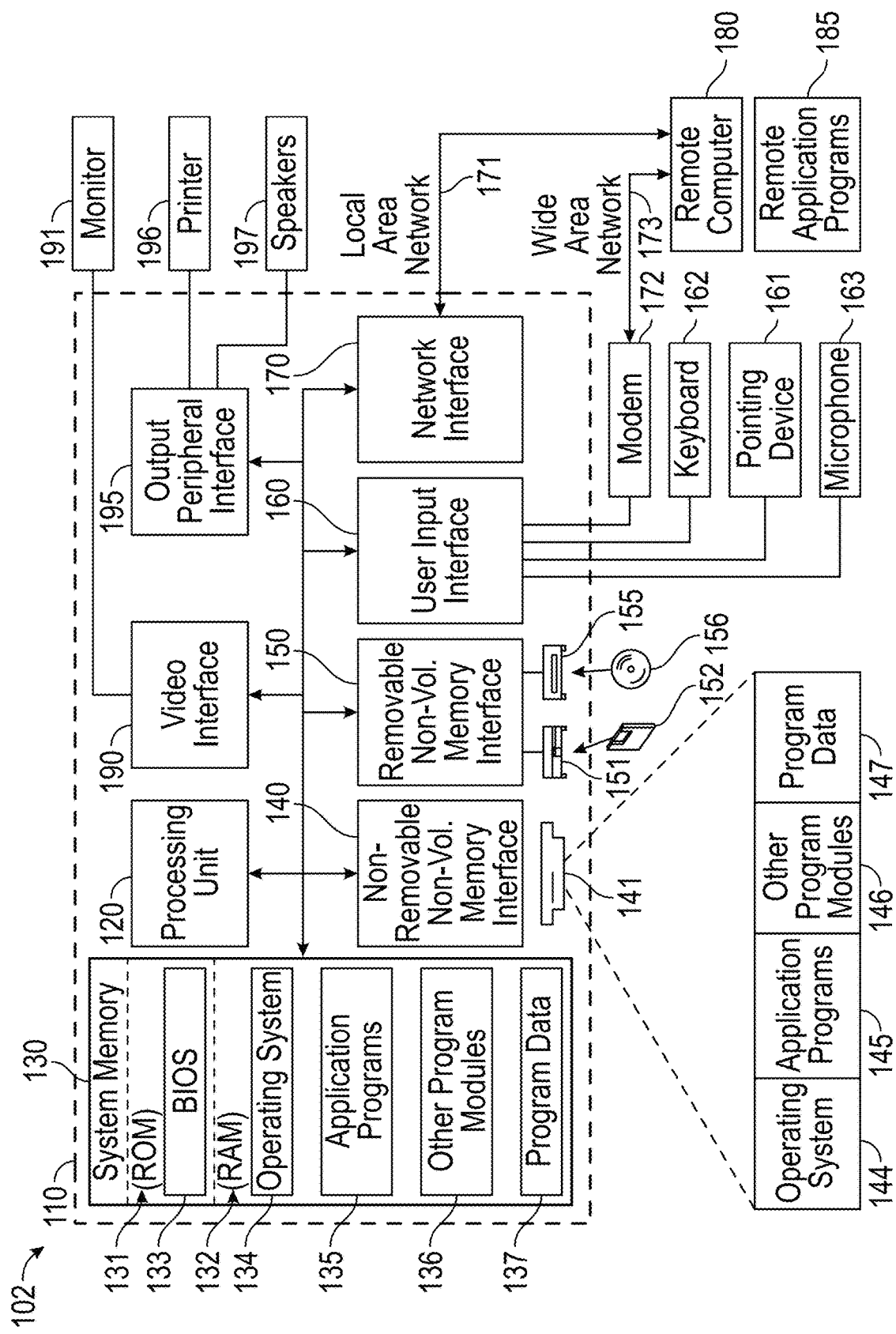
FIG. 1 shows a diagram of an example computing system that may be used with some embodiments of the present invention.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

In general, a multi-tenant database environment may include multiple databases configured to store data associated with organizations or customers. The data (also referred to as customer data) may be unencrypted when it is stored by the customers. The customer data may be encrypted while it is at rest using asymmetric or symmetric cryptography. The encrypted customer data protects it from being accessed by any unauthorized users. While it may be important to encrypt the customer data, it may be desirable to secure the decryption key (private key or the symmetric key). The decryption key may be stored in a storage area that only certain authorized personnel can access (e.g., a database administrator). When the customer wants to retrieve the customer data, the encrypted customer data may be decrypted using the decryption key. The decrypted customer data may then be transmitted to the customer. The encrypted customer data may be stored in any storage area associated with the multi-tenant database environment, including cloud-based storage area, non-cloud-based storage area, or other forms of storage implementations.

One technique to protect a decryption key is to use a hardware security module (HSM). The HSM offers onboard secure key generation and onboard key storage and management. The HSM may be used to generate asymmetric or symmetric key pairs. The HSM may hold private keys in its storage such that the private keys cannot be extracted by external parties. A password may be required to use an HSM that is installed in a system. The HSM may be a Universal Serial Bus (USB) device connected via a USB port, or it may be a card device installed via a system board, or it could be a network attached device.

Conventional systems for securing customer data may use key wrapping to generate a symmetric key that is subsequently used to encrypt customer data. Other systems may utilize Rivest-Shamir-Adleman (RSA) encryption to allow messages to be communicated between client systems and an application server. Such approaches may have several disadvantages. First, private keys must be persisted on the application server, meaning there are multiple potential areas that security can be compromised (the application server and the HSM server). Also, using conventional approaches, derivation of a symmetric key may involve time and computationally expensive processing, such as password-based key wrapping. When the key derivation process takes such significant resources, often the HSM is required to store all key fragments used for encryption in cache; for multiple tenants, this may create significant security risks, as unauthorized access to the HSM could result in malicious users having access to symmetric keys for multiple entities. Furthermore, quantum computing has been speculated as being able to compromise RSA encryption, rendering customer data encrypted using a RSA key vulnerable at some time in the future.

The disclosed embodiments may be related to encrypting and decrypting or securing customer data in a computer-implemented system. The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Computer System

FIG. 1 is a diagram of an example computing system that may be used with some embodiments of the present invention. The computing system 102 may be used by a customer or an organization to transmit customer data to be stored in a storage area associated with a multi-tenant database environment. For example, the multi-tenant database environment may be associated with the services provided by Salesforce.com®. The computing system 102 may also be used to retrieve the customer data from the storage area.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Network

Figure 2:
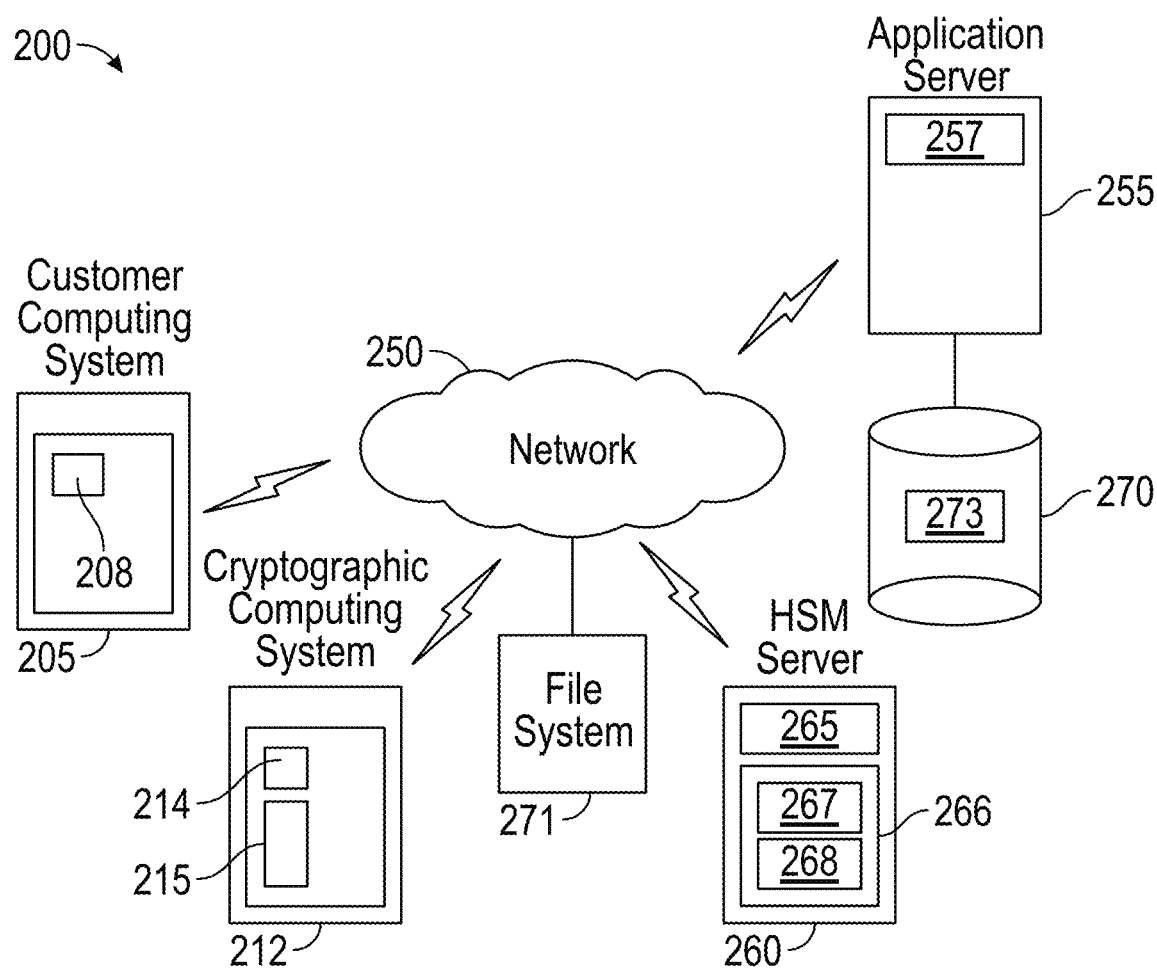
FIG. 2 shows a diagram of an example network environment that may be used with some embodiments of the present invention.

FIG. 2 shows a diagram of an example network environment that may be used with some embodiments of the present invention. Network environment 200 includes computing systems 205 and 212. One or more of the computing systems 205 and 212 may be a mobile computing system. The computing systems 205 and 212 may be connected to the network 250 via a cellular connection or via a Wi-Fi router (not shown). The network 250 may be the Internet. The computing systems 205 and 212 may be coupled with one or more server computing systems 255 and 260 via the network 250.

The application server 255 may be in communication with a plurality of customer devices over network 250. Each computing systems 205 may be associated with a customer and may include customer application module 208. A user may use the customer computing system 205 and the customer application module 208 to connect to and communicate with the server computing system 255 (also referred to as an application server 255) and log into application 257 (e.g., a Salesforce.com® application). The user may transmit customer data to the application server 255 and may request for the customer data from the application server 255.

The application server 255 may be coupled with database 270 configured to store the customer data. The application server 255 may be associated with an entity (e.g., Salesforce.com®). The entity may generate a key pair for cryptography. The key pair includes a public key 273 and a private key (not shown). The private key is not made available publicly, but kept secret by the entity (also referred to as the key holder). The public key 273 may be made available to anyone by means of a digital certificate issued by a certificate authority (CA). The certificate is also a confirmation or validation by the CA that the public key contained in the certificate belongs to the entity noted in the certificate. For example, a customer can download the certificate and get the public key 273 to encrypt the customer data to be transmitted to the application server 255. Only the entity (or holder of the private key) can decrypt the customer data that has been encrypted using the public key 273.

The application server 255 may be coupled with cryptographic computing system 212 configured with cryptographic application module 214. The cryptographic application module 214 may be configured to generate public keys, private keys, symmetric keys, and key fragments for one or more key releases, as described with FIG. 4A.

The application server 255 may be coupled with file system 271. The file system 271 may be configured to store various encrypted keys, including the keys generated by the cryptographic computing system 212.

The application server 255 may be coupled with the security server computing system 260 (also referred to as the HSM server 260) configured with an HSM 266. The HSM 266 may be associated with an HSM public key 267 and an HSM private key 268. The HSM server 260 may include HSM application module 265 configured to interact with the HSM 266 and to perform various encrypting and decrypting operations. For example, the HSM application module 265 may use the HSM private key 268 to decrypt data previously encrypted using the corresponding HSM public key 267. A password may be required to access the HSM 266. For load balancing purposes, there may be multiple application servers 255 and multiple HSM servers 260 connected to a load balancer (not shown). All the application servers 255 may need to know which HSM servers 260 they can talk to at any particular time.

For some embodiments, the file system 271 may be synchronized with the file system local to the HSM server 260. This may enable the HSM server 260 to access and store data in the file system 271 as if the file system 271 is a local file system. For some embodiments, the HSM server 260 may only respond to inquiries transmitted by the application server 255. This may prevent access to data or services associated with the HSM server 260 by any unauthorized users. For example, the application server 255 may need to digitally sign every request that it sends to the HSM server 260 using a secret that they share.

Symmetric Key Use

Figure 3:
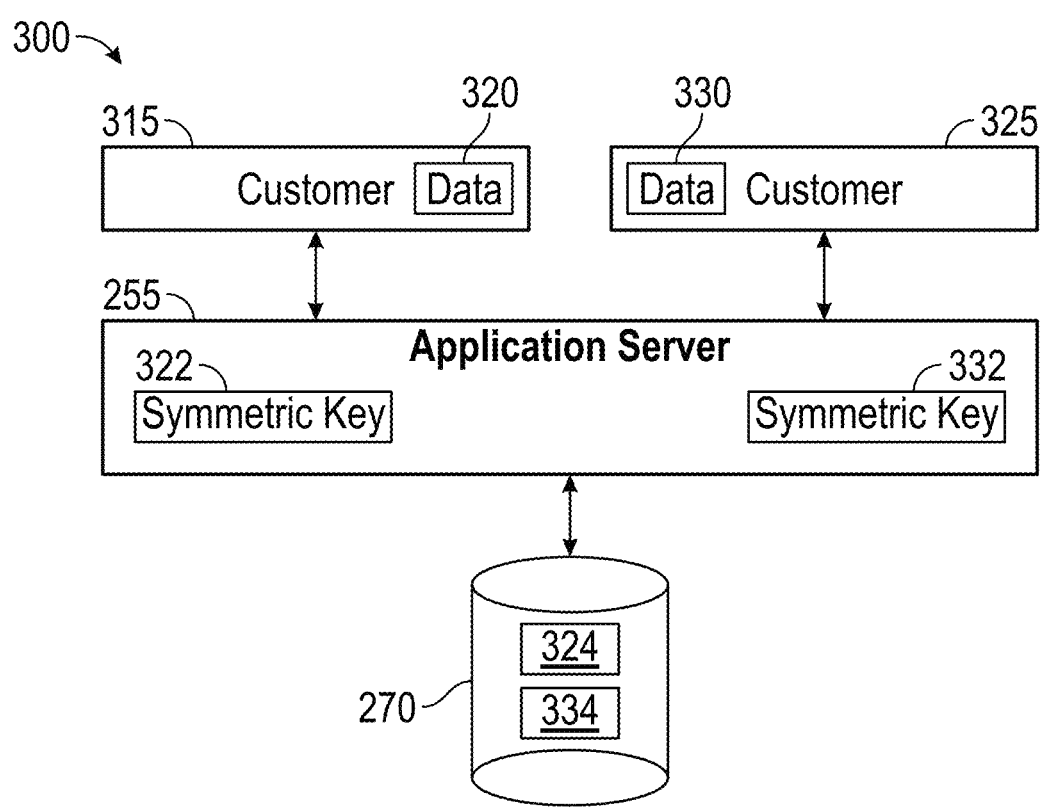
FIG. 3 illustrates an example relationship between a symmetric key and a customer, in accordance with some embodiments.

FIG. 3 illustrates an example relationship between a symmetric key and a customer, in accordance with some embodiments. In this example, there are two customers 315 and 325. During operation, the customer 315 may transmit its customer data 320 to the application server 255. The application server 255 then uses the symmetric key 322 unique to the customer 315 to encrypt the customer data 320 and generate encrypted customer data 324. The encrypted customer data 324 is then saved in the database 270. Subsequently, when the customer 315 requests for its customer data, the encrypted customer data 324 is retrieved from the database 270, decrypted by the application server 255 using the symmetric key 322, and the decrypted customer data 320 is transmitted to the customer 315.

Similarly, the customer 325 may transmit its customer data 330 to the application server 255. The application server 255 then uses the symmetric key 332 unique to the customer 325 to encrypt the customer data 330 and generate encrypted customer data 334. The encrypted customer data 334 is then saved in the database 270. Subsequently, when the customer 325 requests for its customer data, the encrypted customer data 334 is retrieved from the database 270, decrypted by the application server 255 using the symmetric key 332, and the decrypted customer data 330 is transmitted to the customer 325.

When the application server 255 needs to access the symmetric key 322 or 332, the application server 255 may check to find out if the symmetric key 322 or 332 exists in the in-memory cache 307. If the symmetric key 322 or 332 exists in the in-memory cache 307, it is accessed and used by the application server 255. If the symmetric key 322 or 332 does not exist in the in-memory cache 307, the application server 255 may request that the security server derive the symmetric key 322 or 332, receive the symmetric key, and use the re-generated symmetric key to decrypt the corresponding encrypted customer data.

Figure 4:
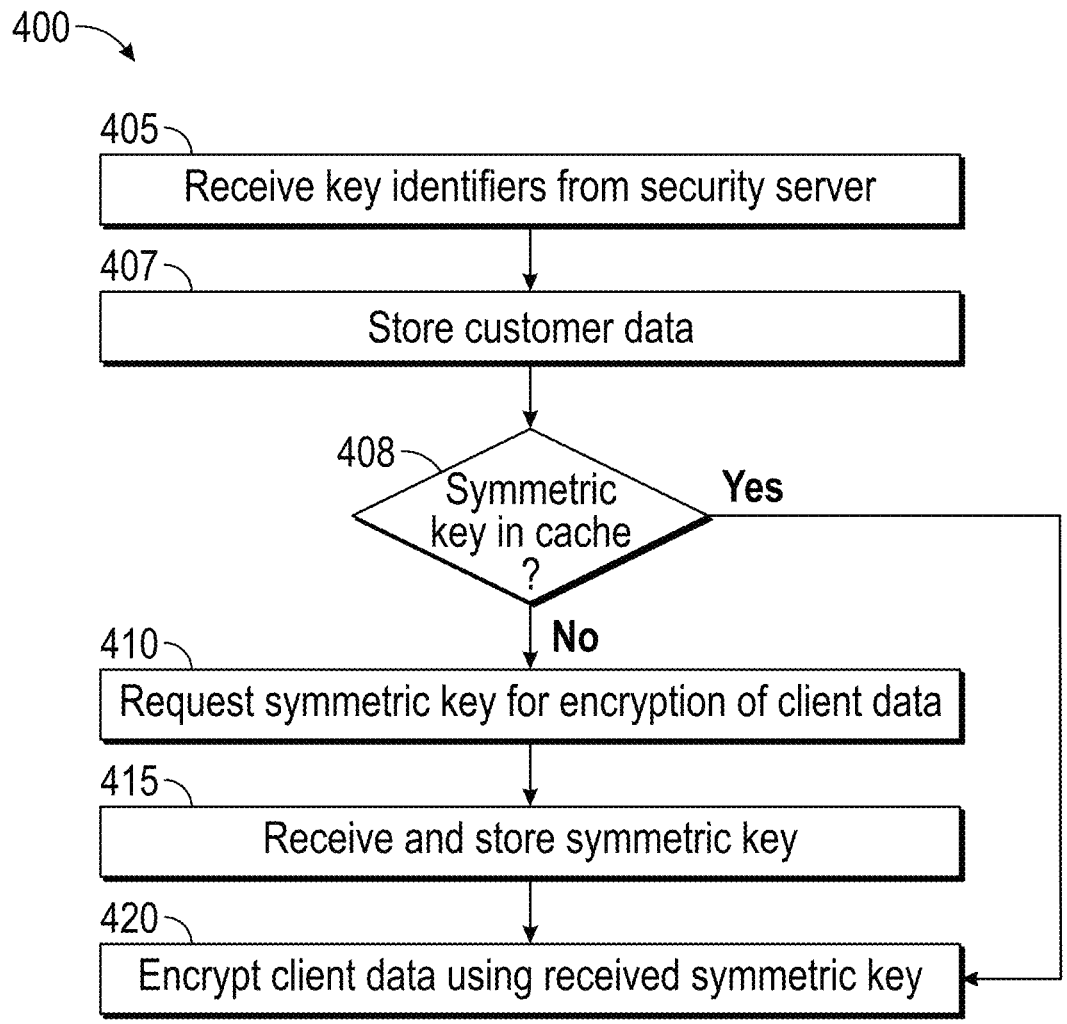
FIG. 4 shows a flowchart of an example process for encrypting customer data using a symmetric key generated using key agreement, performed in accordance with some embodiments.

FIG. 4 shows a specific embodiment of a flow diagram for a method 400 for requesting a symmetric key generated using key agreement for encrypting and/or decrypting customer data. The process 600 may be performed by an application server 255 (shown in FIG. 2) in communication with a security server 260 and the HSM 266. A key identifier may be received, at a setup time, for example, from a security server, such as the security server 260, over a network connection and may be stored by an application server (e.g., application server 255) at step 405. The key identifier may be one of many key identifiers received from the security server, which may set aside a plurality of private keys for the application server to use for security servers. The key identifier may be associated with a private key, where the private key is accessible by the security server and not accessible by the application server. At block 407 customer data may be received by the application server for storage, for example, in the database 270. The customer data will be encrypted prior to storage in the database 270, and therefore receipt of the customer data by the application server will trigger step 408. Alternatively, a request may be made by a customer for data previously encrypted by the application server and stored in database 270. The request may be made by a user using the customer computing system 205 via an application program interface (API) or a user interface (UI). Once the customer data has been identified in the database, the symmetric key used to encrypt the customer data must be used to decrypt the customer data prior to transmitting the requested data to the customer.

At step 408, the application server 255 may determine if the symmetric key 308 exists in the in-memory cache 307 of the application server 255. If the symmetric key 308 is found, the process may flow to step 420 where the symmetric key 308 may be used to encrypt (or decrypt, if a customer is querying for encrypted data stored in the database 270) the customer data. Decrypted customer data may then be transmitted to the user or, in the encryption case, the encrypted customer data may be stored on the application server (e.g., in database 270, or similar data structure).

From block 408, if the application server 255 cannot find the symmetric key 322 in the in-memory cache 307, the symmetric key 322 needs to be derived. A request for a symmetric key may be transmitted to the security server by the application server at step 410. The request may be transmitted after the application server stores the key identifier, and may include a public key generated by the application server, a salt value, and the key identifier.

Figure 5:
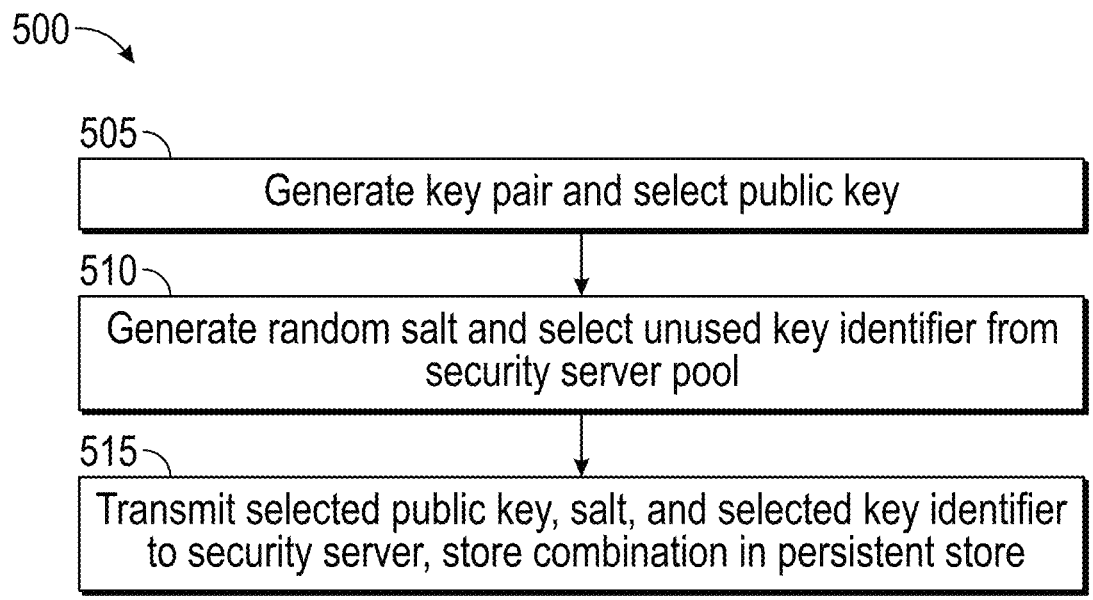
FIG. 5 shows a flowchart of an example process for generating a request for a symmetric key generated using key agreement in accordance with some embodiments.

FIG. 5 shows a flowchart of an example process for generating a request for a symmetric key generated using key agreement in accordance with some embodiments. At step 505, the application server may generate a public-private key pair, and the public key may be used for the request for the symmetric key. The public and private keys may be generated using any suitable method, including, but not limited to, elliptic curve cryptographic methods (where both the public key and the private key correspond to different points on an elliptic curve and are encrypted using elliptic curve cryptography). At step 510 a random salt value may be generated and an unused key identifier from the security server pool. The random salt value may be randomly-generated data used to generate each symmetric key, where a different salt numeric value or string may be used for each symmetric key request. The salt value generally has enough bits to be unique among a potentially large number of clients, wherein having more bits increases security, but also increases the complexity (and potentially time delay) of generating the symmetric key.

The key identifier may be selected from a plurality of key identifiers available to the application server 255 via the security server pool of keys, a list of which has been previously transmitted to the application server as described above. Finally, the request, including the generated public key, the salt value, and the key identifier may be transmitted to the security server at step 515 by the application server. Furthermore, the combination of public key, salt value, and key identifier may be stored in a persistent store (i.e. a data structure) of the application server, so the application server may easily re-generate a symmetric key at a later date.

Figure 6:
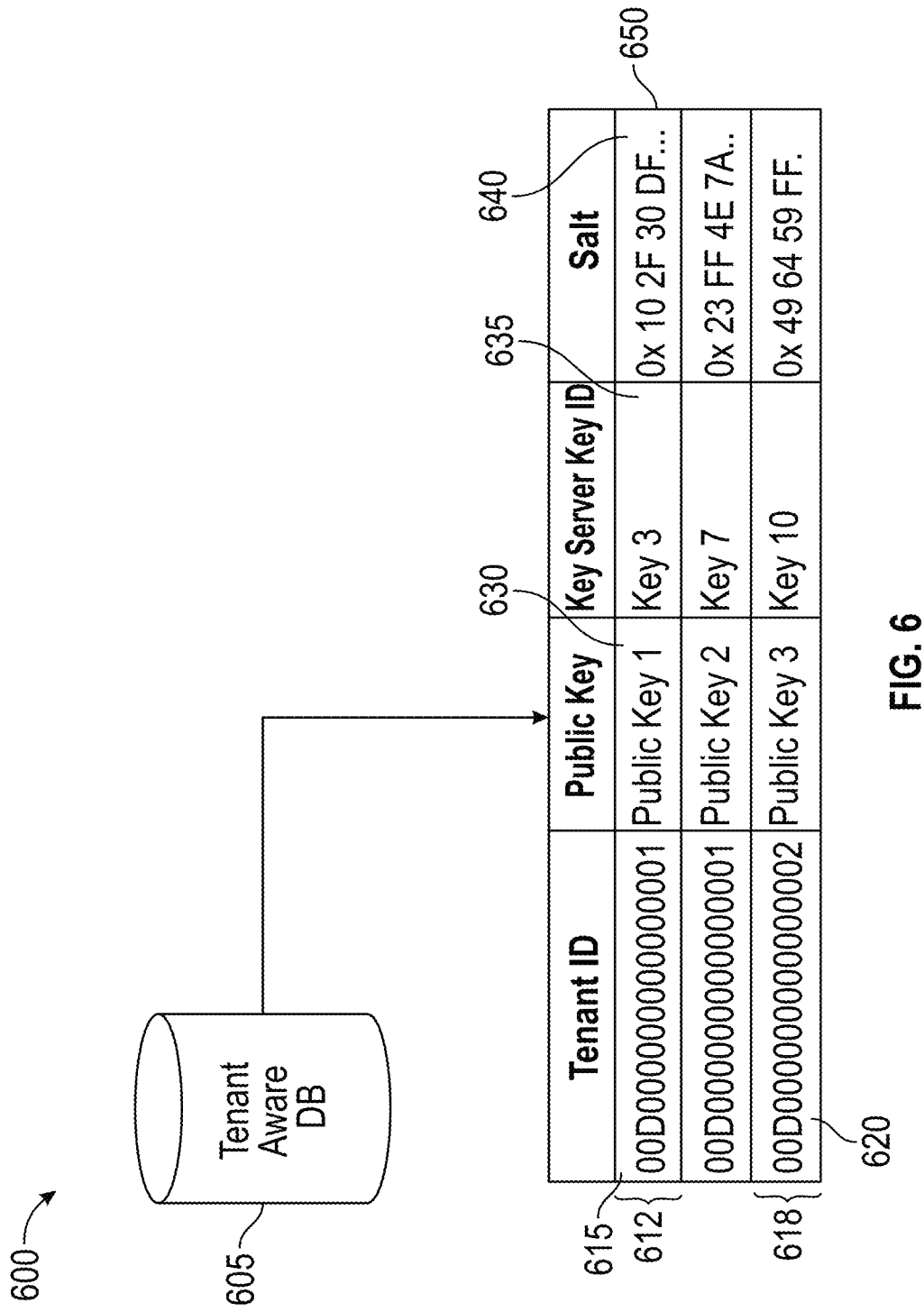
FIG. 6 shows an example data structure listing various symmetric keys assigned to different tenants in a multitenant environment, in accordance with various embodiments.

FIG. 6 shows a simplified block diagram 600 that includes an example data structure 650 listing various symmetric keys assigned to different tenants in a multi-tenant environment, in accordance with various embodiments. Diagram 600 includes tenant aware database 605, which may correspond to database 270 in communication with the application server 255 in FIG. 2, which includes data structure 650. Data structure 650 may be a persistent store that includes combinations of public keys, key identifiers (also referred to as key server IDs), and random salt values used to generate symmetric keys for a plurality of tenants (e.g., the customers 315 and 325 from FIG. 3). Rows, such as row 612 and row 618 of the data structure 650 may correspond to individual symmetric keys that have been used by the application server.

Symmetric keys for multiple tenants may be included in the data structure 650, as exemplified by symmetric key entry 618 having a different Tenant ID 620 than symmetric key entry 612. As shown for symmetric key entry 612, each symmetric key entry may be associated with a tenant id field value 615, a public key value 630 (associated with the public key generated by the application server in requesting the symmetric key corresponding to entry 612), a key identifier value 635 (associated with private key accessible by the security server used to generate the symmetric key) and the salt value 640 (a randomly generated number or string, as shown). In situations where the application is decrypting customer data, metadata associated with the customer data may be used to identify which symmetric key in the data structure 650 was used to encrypt the customer data. This metadata may include any identifying information that allows the application server to identify the symmetric key used for the encryption, including, for example the public key value 630 for the symmetric key used to encrypt the customer data. Since the public key values for each symmetric key may be unique (i.e., public keys are not reused for different symmetric keys, to provide greater security) in various embodiments, the public key value 630 may be useful in identifying symmetric keys for purposes of decrypting encrypted customer data.

Figure 8:
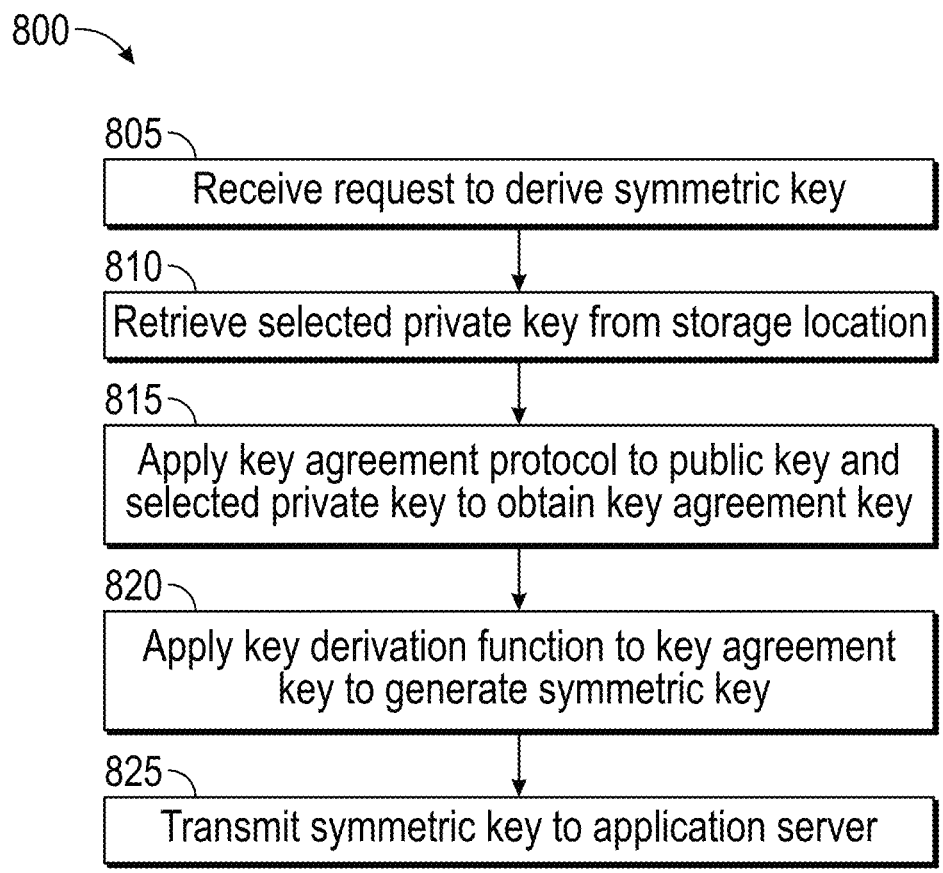
FIG. 8 shows a flowchart of an example process for generating a symmetric key using key agreement, performed in accordance with some embodiments.

As stated in step 410 of FIG. 4, the request for the symmetric key may be transmitted to the security server, which may generate the symmetric key using the data specified by the request. FIG. 8 shows a flowchart of an example process 800 for generating a symmetric key using key agreement, performed in accordance with some embodiments. While in some embodiments, the security server may be out of the control of the customer whose data is to be encrypted/decrypted by the symmetric key, this may not always be the case. In some embodiments, the customer may themselves, using a customer-hosted key serve in communication with an HSM or other suitable key store. At step 805, the request to derive a symmetric key is received by the security server from the application server, the request including the public key, the salt value, and the key identifier associated with the private key, as described above.

Figure 7:
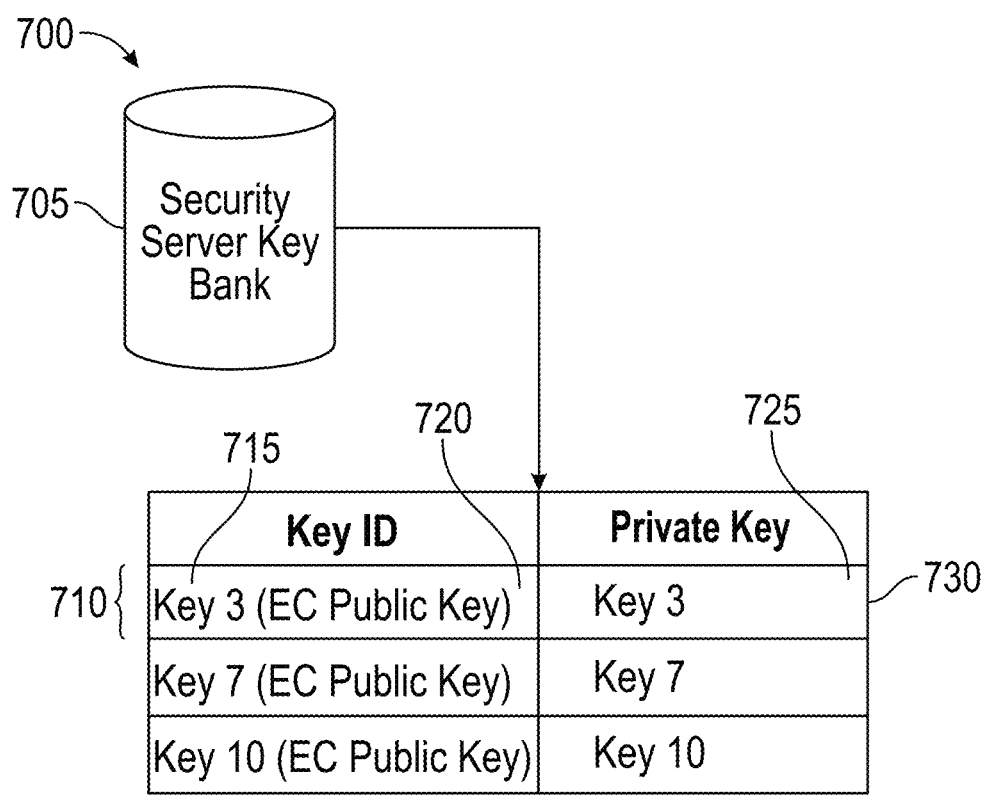
FIG. 7 shows an example data structure listing key identifiers with their corresponding private keys, in accordance with various embodiments.

In response to receiving the request, the security server may derive the symmetric key based on the received public key, the salt value, and the private key identified by the key identifier using a key derivation function. The key derivation may commence by retrieving the private key from a storage location that is not accessible by the application server at step 810. The private key may alternatively be retrieved from a key management service in communication with the security server. The key management service may store a plurality of private keys (in an HSM, for example, or storage under the control of the key management service) linked to a plurality of key identifiers provided to the security server. The key management service may take the form of an HSM that secures all private keys included therein, which may be in communication with the security server over a network connection. Alternatively, the key management service may split the private keys among a plurality of key servers, where secret sharing multi-party computations only allows a subset of the key servers (including a key management service server) to perform cryptographic computations that effectively allow access to the private keys from the locations where the key shares are stored, without actually assembling the private keys on the key servers. Such embodiments may provide additional security, by not storing the private keys on the security server, and only providing them upon request. Alternatively, the storage location may be a data store within the security server. FIG. 7 shows a simplified block diagram 700 showing an example data structure 730 listing key identifiers (e.g. on each row, such as row 710) with their corresponding private keys, in accordance with various embodiments.

Data structure 730, which includes a list of asymmetric key pairs (of public and private keys), may be stored within a security server key bank 705, which may be an HSM, a key management service in communication with the security server, or can be a data store within the security server itself in various embodiments. Row 710 exemplifies an asymmetric key pair record within the private key data structure 730, listing the corresponding key identifier 715 for the asymmetric key pair and the private key 725 associated with the key identifier. Row 710 may also include the public key 720 associated with the private key 725; the public key 720 may be an elliptic curve public key generated via elliptic curve cryptography, as shown in exemplary data structure 730. Public key 720 may generally not be used in the generation of symmetric keys, and may be discarded in some embodiments by the key service.

Returning to FIG. 8, after retrieving the private key, a key agreement protocol may be applied to the public key and the private key selected in the request by the key identifier to obtain a key agreement key at step 815. Any suitable key agreement protocol may be used to generate a key agreement key from the public key and the private key associated with the key identifier, including a Diffie-Hellman key exchange, anonymous key exchange, etc. In an exemplary embodiment, the key agreement protocol may be based on the elliptic curve function common to the generation of the public key and the private key associated with the key identifier. The public key and the private key associated with the key identifier may be derived from the same elliptic curve (despite being from distinct elliptic curve key pairs corresponding to different points on the elliptic curve), and any suitable key agreement function may be applied to the public key and the private key associated with the key identifier. Such functions may be as simple as multiplication of the public key by the private key associated with the key identifier to obtain a unique number. Use of key agreement may be advantageous for generation of symmetric keys in encryption due to other methods, such as key wrapping, being vulnerable to a quantum computing attack. Key agreement, by contrast, is generally more secure, even against quantum computing code-breaking technologies.

Finally, the symmetric key may be generated by the security server by applying a key derivation function to the key agreement key at step 820. The key derivation function may be a suitable cryptographic hash function that creates the symmetric key based on the key agreement key and the salt value received with the request to derive the symmetric key. Exemplary key derivation functions that may be used include PBKDF2, bcrypt, scrypt, and the like. After the symmetric key is generated, it may be transmitted to the requesting application server at step 825. As described below, the symmetric key may be subsequently stored in an in-memory cache of the application server, and be used by the application server to encrypt customer data stored by the application server.

Returning to FIG. 4, at step 420 customer data may be encrypted by the application server using the received symmetric key. The encrypted customer data is protected from being accessed by any unauthorized users, as possession of the symmetric key is needed to decrypt the customer data. When the customer wants to retrieve the customer data, the encrypted customer data may be decrypted using the symmetric key, which may be stored in the cache memory of the application server, or may be re-derived by the application server, which has access to the public key, the salt value, and the key identifier used to derive the symmetric key (e.g., via data structure 650). The decrypted customer data may then be transmitted to the customer.

The encrypted customer data may be stored in any persistent storage in communication with the application server and associated with the multi-tenant database environment. Examples of such persistent storage may be cloud-based storage area, non-cloud-based storage area, or other forms of storage implementations. Different tenants may utilize different persistent storage, which may be easily tracked by the application server using the unique tenant IDs associated with one or more symmetric keys for each tenant in the data structure 650.

Compared to conventional data protection schemes, the method 400 advantageously does not require persisting of a private key data either on the application server or the security server (for embodiments where the private key associated with the key identifier is stored on an HSM or other external storage), thereby improving security by not comprising the symmetric key if either the application server or the security server are compromised. Not only is security improved by not persisting private keys, method 400 also reduces the amount of cache needed, as conventional systems require persisting of private keys in cache memory, which can be resource intensive in a multi-tenant environment. Only the public keys used to generate the symmetric keys are required to re-generate a symmetric key after the symmetric key is removed from the cache; in some embodiments, the private key used by the application server to generate the public key may be disposed of to conserve memory resources. Finally, method 400 represents a different use of key agreement than conventional usages. Where conventionally, key agreement is generally used to secure communications between two devices, method 400 uses key agreement to securely generate a symmetric key to encrypt data from $3^{rd}$-party customer devices, which are not used to generate the symmetric key. As noted above, no single party can compromise the symmetric key generated using method 400, providing unique benefits for multi-tenant application servers to secure customer data.

Figure 9:
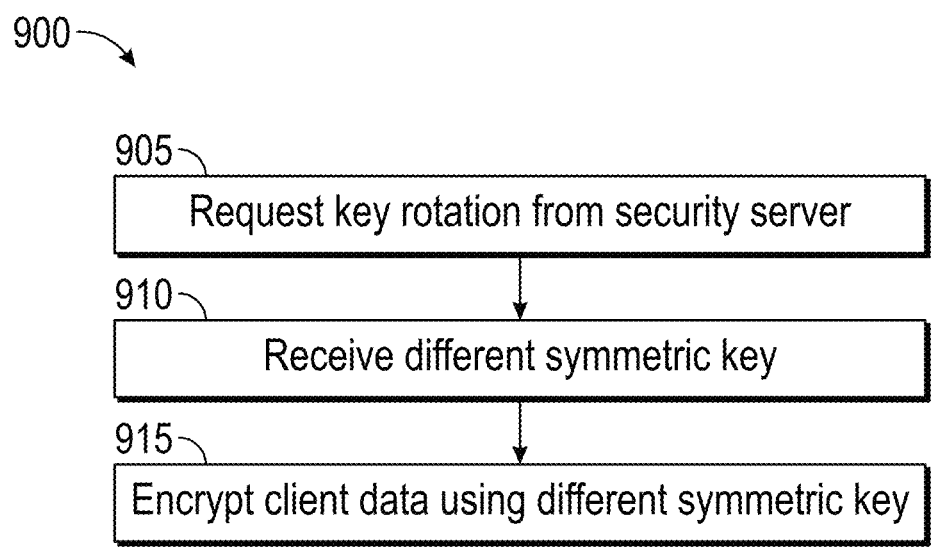
FIG. 9 shows a flowchart of an example process for performing key rotation on an application server, in accordance with various embodiments.

Over time, it may be a good practice for customers to rotate the symmetric keys used to encrypt their data (i.e., use a different symmetric key to encrypt their data), to provide more security for the encrypted data. To do so, the application server may simply send a new request to the security server for a different symmetric key. This request to rate the symmetric keys for a specific customer may be initiated by the customer, by an administrator of the application server, or automatically by the application server (e.g., after a predetermined period of time) in various embodiments. FIG. 9 shows a flowchart of an example process 900 for performing key rotation on an application server, in accordance with various embodiments. At step 905, the application server may transmit a request to rotate the symmetric key, the request to rotate including a different public key generated by the application server, a different salt value, and a different key identifier associated with a different private key accessible by the private server. Different elements are used in the request for the rotated symmetric key to improve security, as having common elements could increase a likelihood that if the current symmetric key were compromised, then the rotated symmetric key could also be compromised.

After the security server receives the request to rotate the symmetric key, the security server may repeat the symmetric key generation process illustrated, for example, by method 800 in FIG. 8, using the different components received in the request to rotate the symmetric key. A different symmetric key may then be transmitted from the security server to the application server at step 910 in response to the request to rotate the symmetric key. The different symmetric key may be derived based on the different public key and the different private key associated with the different key identifier using the key derivation function used to generate the symmetric key.

The different symmetric key may be linked to the symmetric key, such as a tenant key data structure, and further be stored in an in-memory cache of the application server. FIG. 10 shows an example data structure 1000 storing an entry 1010 for a rotated symmetric key for a client in a multitenant environment, in accordance with various embodiments. It is clear entry 1010 in the tenant key data structure is a rotated symmetric key associated with entry 1005 because the tenant ID 1009 matches the tenant ID 1007. As per the description above, the public key 1015, the key identifier 1020 and the salt value 1025 of the symmetric key associated with entry 1010 are unique to provide improved security via the rotated key.

Once the different symmetric key has been cached, it may be used by the application server to encrypt data subsequently received from one of the plurality of customer devices at step 915. In certain situations, it may be desirable to destroy the symmetric key previously used by a customer (e.g., if one of the components used to generate the symmetric key has been compromised). This may be accomplished by the application server deleting the symmetric key from a list of symmetric keys associated with the application server (e.g., the tenant key data structure discussed above). The list of symmetric keys may be stored on the application server itself, or in a database in communication with the application server, where the database stores the encrypted customer data as well. FIG. 11 shows an example data structure 1100 displaying destruction of a symmetric key, in accordance with various embodiments. Data structure 1100 is based on data structure 1000, where symmetric key 1105 the customer associated with the Tenant IDs 1007 and 1009 has been deleted from the list of symmetric keys in the data structure 1100. By deleting the public key 1120 and the salt value 1125 for the symmetric key associated with entry 1105, no record exists for re-creation of the symmetric key associated with entry 1105. Without the symmetric key, any customer data encrypted with the symmetric key associated with entry 1105 cannot be decrypted.

On-Demand Service Environment

Figure 12A:
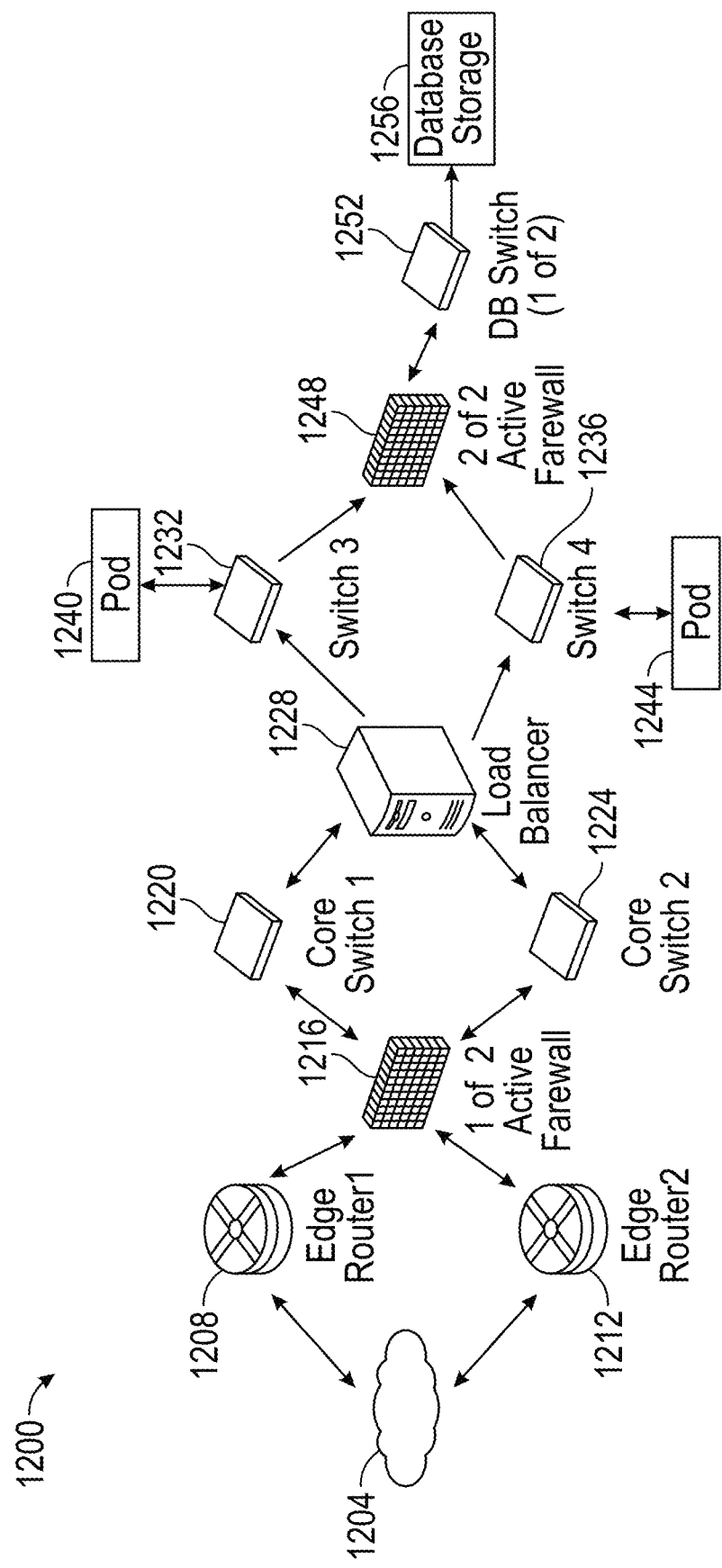
FIG. 12A shows a system diagram 800 illustrating architectural components of an applicable environment, in accordance with some embodiments.

FIG. 12A shows a system diagram 1200 illustrating architectural components of an on-demand service environment, in accordance with some embodiments. A client machine located in the cloud 1204 (or Internet) may communicate with the on-demand service environment via one or more edge routers 1208 and 1212. The edge routers may communicate with one or more core switches 1220 and 1224 via firewall 1216. The core switches may communicate with a load balancer 1228, which may distribute server load over different pods, such as the pods 1240 and 1244. The pods 1240 and 1244, which may each include one or more servers and/or other computing resources, may perform data processing and other operations used to provide on-demand services. Communication with the pods may be conducted via pod switches 1232 and 1236. Components of the on-demand service environment may communicate with a database storage system 1256 via a database firewall 1248 and a database switch 1252.

Figure 12B:
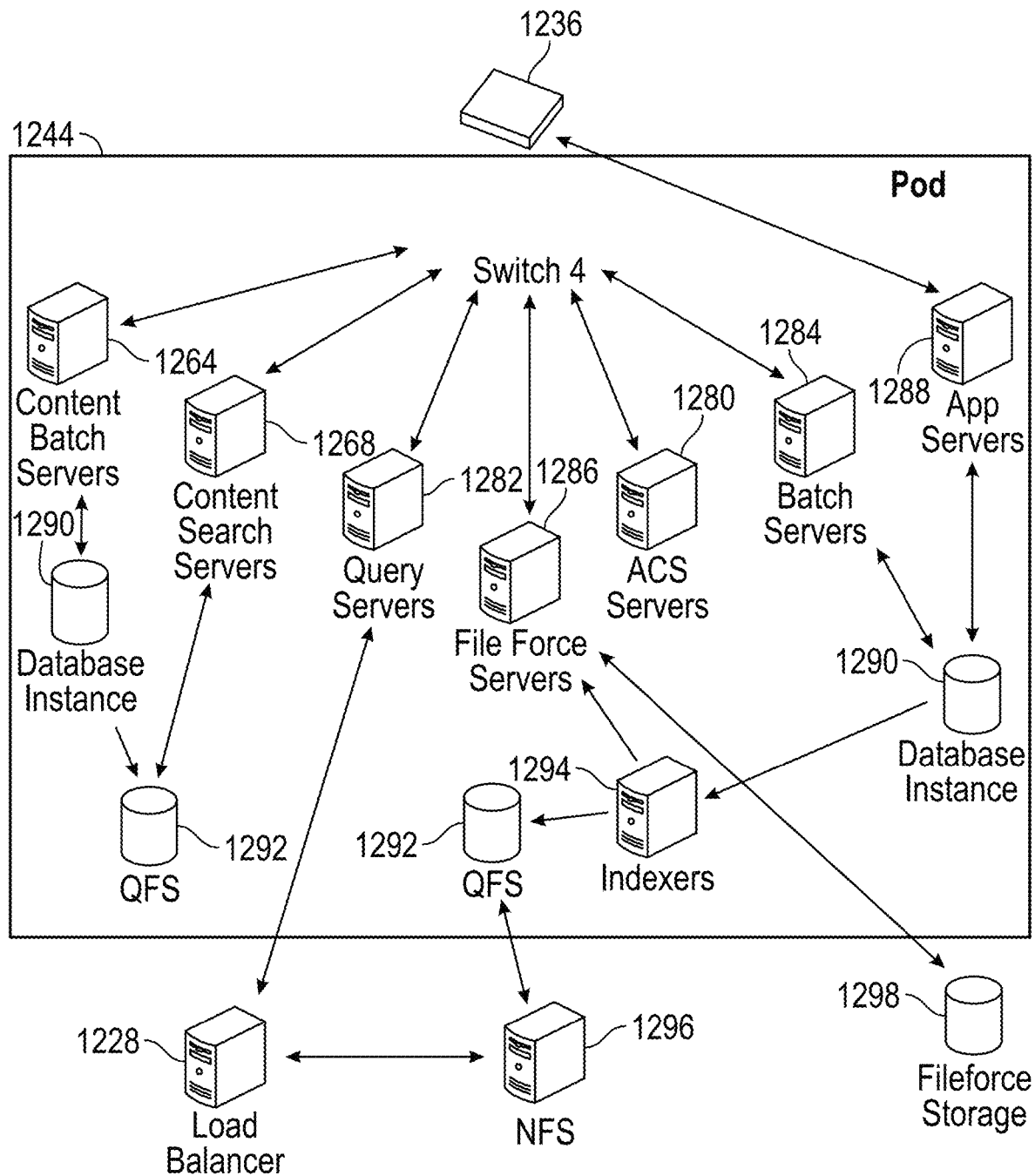
FIG. 12B shows a system diagram further illustrating architectural components of an applicable environment, in accordance with some embodiments.

As shown in FIGS. 12A and 12B, accessing an on-demand service environment may involve communications transmitted among a variety of different hardware and/or software components. Further, the on-demand service environment 1200 is a simplified representation of an actual on-demand service environment. For example, while only one or two devices of each type are shown in FIGS. 12A and 12B, some embodiments of an on-demand service environment may include anywhere from one to many devices of each type. Also, the on-demand service environment need not include each device shown in FIGS. 12A and 12B, or may include additional devices not shown in FIGS. 12A and 12B.

Moreover, one or more of the devices in the on-demand service environment 1200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 1204 is intended to refer to a data network or plurality of data networks, often including the Internet. Client machines located in the cloud 1204 may communicate with the on-demand service environment to access services provided by the on-demand service environment. For example, client machines may access the on-demand service environment to retrieve, store, edit, and/or process information.

In some embodiments, the edge routers 1208 and 1212 route packets between the cloud 1204 and other components of the on-demand service environment 1200. The edge routers 1208 and 1212 may employ the Border Gateway Protocol (BGP). The BGP is the core routing protocol of the Internet. The edge routers 1208 and 1212 may maintain a table of IP networks or 'prefixes' which designate network reachability among autonomous systems on the Internet.

In one or more embodiments, the firewall 1216 may protect the inner components of the on-demand service environment 1200 from Internet traffic. The firewall 1216 may block, permit, or deny access to the inner components of the on-demand service environment 1200 based upon a set of rules and other criteria. The firewall 1216 may act as one or more of a packet filter, an application gateway, a stateful filter, a proxy server, or any other type of firewall.

In some embodiments, the core switches 1220 and 1224 are high-capacity switches that transfer packets within the on-demand service environment 1200. The core switches 1220 and 1224 may be configured as network bridges that quickly route data between different components within the on-demand service environment. In some embodiments, the use of two or more core switches 1220 and 1224 may provide redundancy and/or reduced latency.

In some embodiments, the pods 1240 and 1244 may perform the core data processing and service functions provided by the on-demand service environment. Each pod may include various types of hardware and/or software computing resources. An example of the pod architecture is discussed in greater detail with reference to FIG. 12B.

In some embodiments, communication between the pods 1240 and 1244 may be conducted via the pod switches 1232 and 1236. The pod switches 1232 and 1236 may facilitate communication between the pods 1240 and 1244 and client machines located in the cloud 1204, for example via core switches 1220 and 1224. Also, the pod switches 1232 and 1236 may facilitate communication between the pods 1240 and 1244 and the database storage 1256.

In some embodiments, the load balancer 1228 may distribute workload between the pods 1240 and 1244. Balancing the on-demand service requests between the pods may assist in improving the use of resources, increasing throughput, reducing response times, and/or reducing overhead. The load balancer 1228 may include multilayer switches to analyze and forward traffic.

In some embodiments, access to the database storage 1256 may be guarded by a database firewall 1248. The database firewall 1248 may act as a computer application firewall operating at the database application layer of a protocol stack. The database firewall 1248 may protect the database storage 1256 from application attacks such as structure query language (SQL) injection, database rootkits, and unauthorized information disclosure.

In some embodiments, the database firewall 1248 may include a host using one or more forms of reverse proxy services to proxy traffic before passing it to a gateway router. The database firewall 1248 may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some embodiments, communication with the database storage system 1256 may be conducted via the database switch 1252. The multi-tenant database system 1256 may include more than one hardware and/or software components for handling database queries. Accordingly, the database switch 1252 may direct database queries transmitted by other components of the on-demand service environment (e.g., the pods 1240 and 1244) to the correct components within the database storage system 1256. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 13 and 14.

FIG. 12B shows a system diagram illustrating the architecture of the pod 1244, in accordance with one embodiment. The pod 1244 may be used to render services to a user of the on-demand service environment 1200. In some embodiments, each pod may include a variety of servers and/or other systems. The pod 1244 includes one or more content batch servers 1264, content search servers 1268, query servers 1272, file force servers 1276, access control system (ACS) servers 1280, batch servers 1284, and app servers 1288. Also, the pod 1244 includes database instances 1290, quick file systems (QFS) 1292, and indexers 1294. In one or more embodiments, some or all communication between the servers in the pod 1244 may be transmitted via the switch 1236.

In some embodiments, the application servers 1288 may include a hardware and/or software framework dedicated to the execution of procedures (e.g., programs, routines, scripts) for supporting the construction of applications provided by the on-demand service environment 1200 via the pod 1244. Some such procedures may include operations for providing the services described herein. The content batch servers 1264 may requests internal to the pod. These requests may be long-running and/or not tied to a particular customer. For example, the content batch servers 1264 may handle requests related to log mining, cleanup work, and maintenance tasks.

The content search servers 1268 may provide query and indexer functions. For example, the functions provided by the content search servers 1268 may allow users to search through content stored in the on-demand service environment. The Fileforce servers 1276 may manage requests information stored in the Fileforce storage 1278. The Fileforce storage 1278 may store information such as documents, images, and basic large objects (BLOBs). By managing requests for information using the Fileforce servers 1276, the image footprint on the database may be reduced.

The query servers 1272 may be used to retrieve information from one or more file systems. For example, the query system 1272 may receive requests for information from the app servers 1288 and then transmit information queries to the NFS 1296 located outside the pod. The pod 1244 may share a database instance 1290 configured as a multi-tenant environment in which different organizations share access to the same database. Additionally, services rendered by the pod 1244 may require various hardware and/or software resources. In some embodiments, the ACS servers 1280 may control access to data, hardware resources, or software resources.

In some embodiments, the batch servers 1284 may process batch jobs, which are used to run tasks at specified times. Thus, the batch servers 1284 may transmit instructions to other servers, such as the app servers 1288, to trigger the batch jobs. In some embodiments, the QFS 1292 may be an open source file system available from Sun Microsystems® of Santa Clara, Calif. The QFS may serve as a rapid-access file system for storing and accessing information available within the pod 1244. The QFS 1292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 1268 and/or indexers 1294 to identify, retrieve, move, and/or update data stored in the network file systems 1296 and/or other storage systems.

In some embodiments, one or more query servers 1272 may communicate with the NFS 1296 to retrieve and/or update information stored outside of the pod 1244. The NFS 1296 may allow servers located in the pod 1244 to access information to access files over a network in a manner similar to how local storage is accessed. In some embodiments, queries from the query servers 1222 may be transmitted to the NFS 1296 via the load balancer 1220, which may distribute resource requests over various resources available in the on-demand service environment. The NFS 1296 may also communicate with the QFS 1292 to update the information stored on the NFS 1296 and/or to provide information to the QFS 1292 for use by servers located within the pod 1244.

In some embodiments, the pod may include one or more database instances 1290. The database instance 1290 may transmit information to the QFS 1292. When information is transmitted to the QFS, it may be available for use by servers within the pod 1244 without requiring an additional database call. In some embodiments, database information may be transmitted to the indexer 1294. Indexer 1294 may provide an index of information available in the database 1290 and/or QFS 1292. The index information may be provided to file force servers 1276 and/or the QFS 1292.

Figure 13:
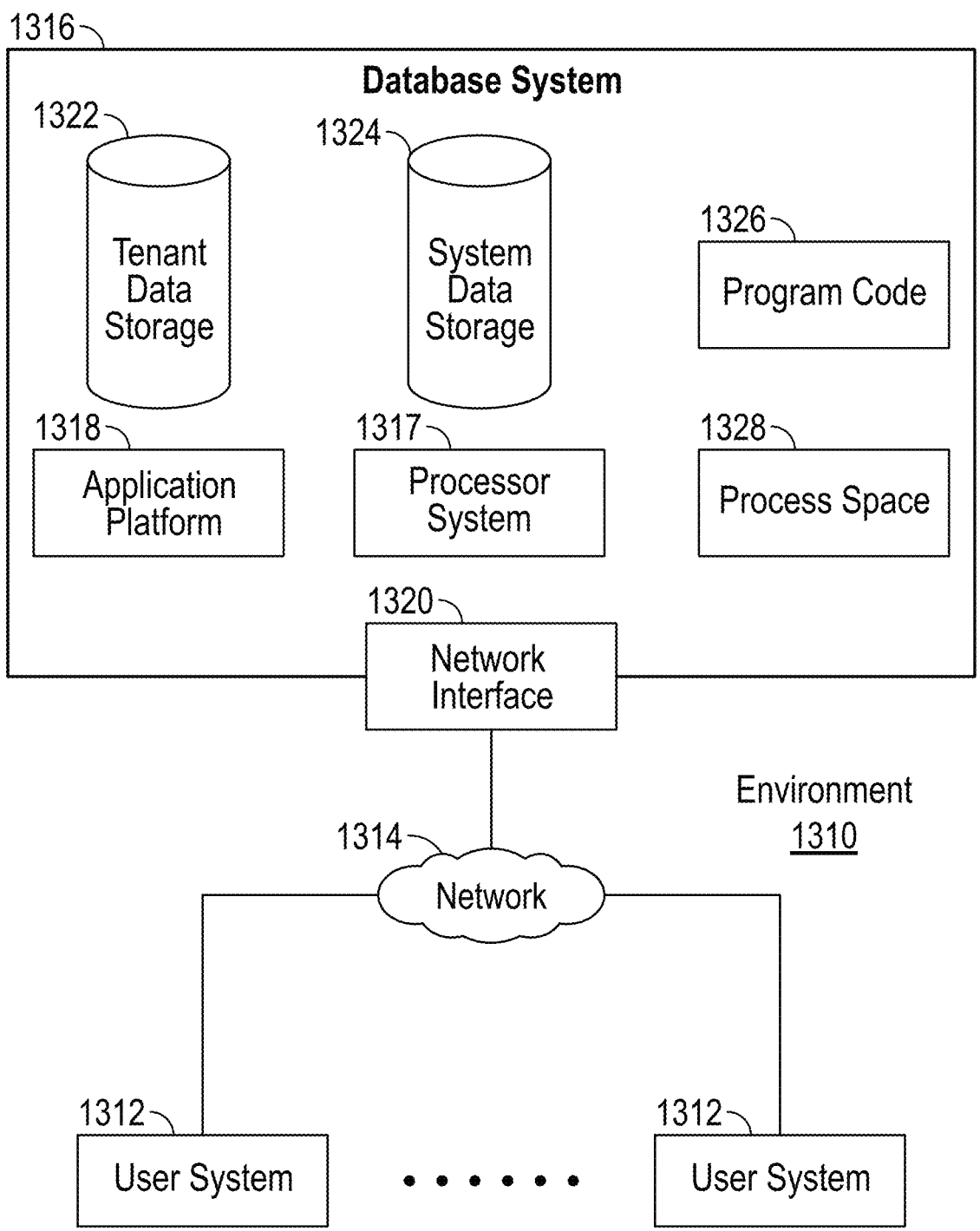
FIG. 13 shows a system diagram illustrating the architecture of a multitenant database environment, in accordance with some embodiments.
Figure 14:
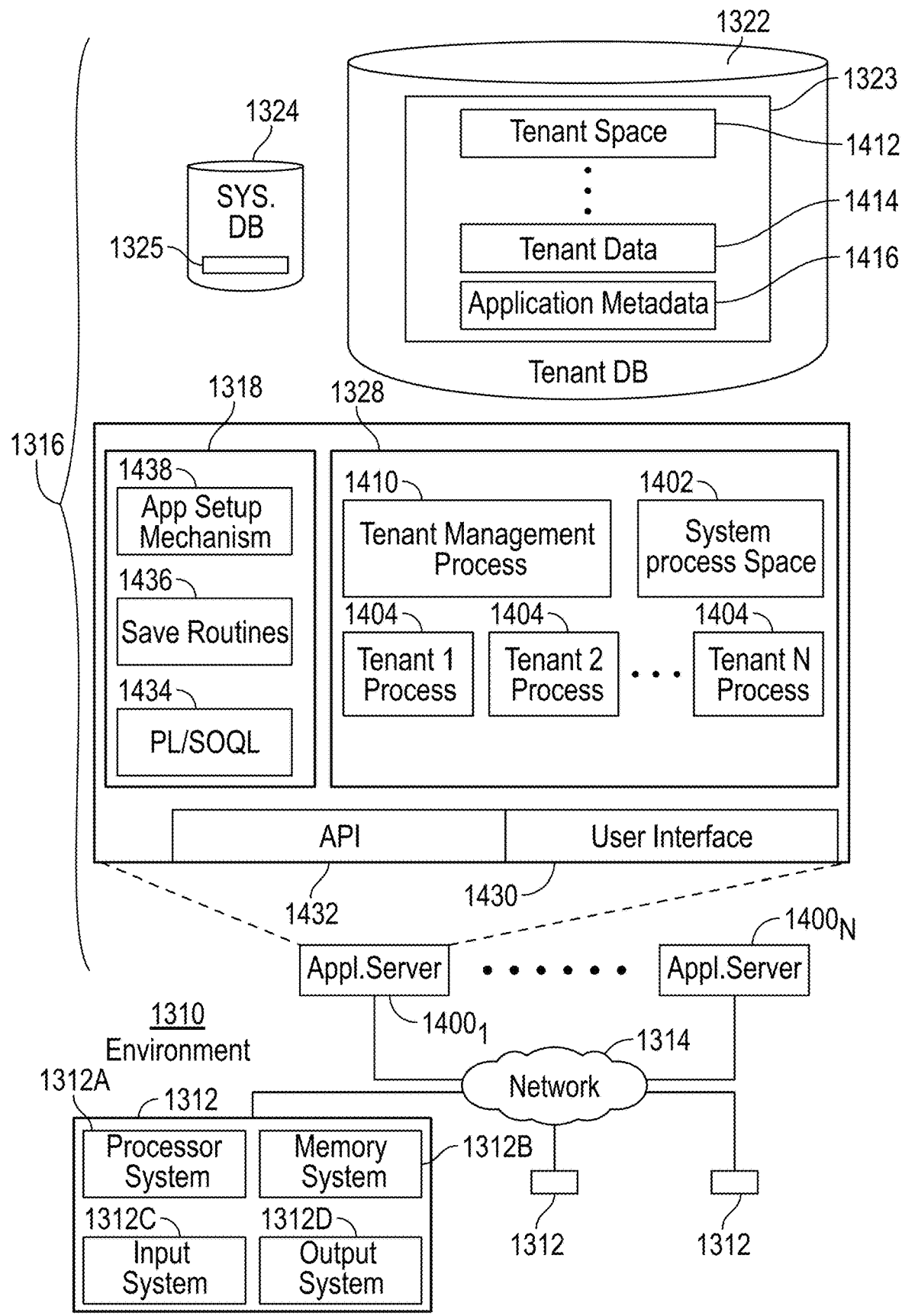
FIG. 14 shows a system diagram further illustrating the architecture of a multi-tenant database environment, in accordance with some embodiments.

FIG. 13 shows a block diagram of an environment 1310 wherein an on-demand database service might be used, in accordance with some embodiments. Environment 1310 includes an on-demand database service 1316. User system 1312 may be any machine or system that is used by a user to access a database user system. For example, any of user systems 1312 can be a handheld computing system, a mobile phone, a laptop computer, a work station, and/or a network of computing systems. As illustrated in FIGS. 13 and 14, user systems 1312 might interact via a network 1314 with the on-demand database service 1316.

An on-demand database service, such as system 1316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1316" and "system 1316" will be used interchangeably herein. A database image may include one or more database objects. A relational database management system (RDBMS) or the equivalent may execute storage and retrieval of information against the database object(s). Application platform 1318 may be a framework that allows the applications of system 1316 to run, such as the hardware and/or software, e.g., the operating system. In an implementation, on-demand database service 1316 may include an application platform 1318 that enables creation, managing and executing one or more applications developed by the provider of the on-demand database service, users accessing the on-demand database service via user systems 1312, or third party application developers accessing the on-demand database service via user systems 1312.

One arrangement for elements of system 1316 is shown in FIG. 13, including a network interface 1320, application platform 1318, tenant data storage 1322 for tenant data 1323, system data storage 1324 for system data 1325 accessible to system 1316 and possibly multiple tenants, program code 1326 for implementing various functions of system 1316, and a process space 1328 for executing MTS system processes and tenant-specific processes, such as running applications as part of an application hosting service. Additional processes that may execute on system 1316 include database indexing processes.

The users of user systems 1312 may differ in their respective capacities, and the capacity of a particular user system 1312 might be entirely determined by permissions (permission levels) for the current user. For example, where a call center agent is using a particular user system 1312 to interact with system 1316, the user system 1312 has the capacities allotted to that call center agent. However, while an administrator is using that user system to interact with system 1316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 1314 is any network or combination of networks of devices that communicate with one another. For example, network 1314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 1312 might communicate with system 1316 using TCP/IP and, at a higher network level, use other common Internet protocols to communicate, such as HTTP, FTP, AFS, WAP, etc. In an example where HTTP is used, user system 1312 might include an HTTP client commonly referred to as a "browser" for sending and receiving HTTP messages to and from an HTTP server at system 1316. Such an HTTP server might be implemented as the sole network interface between system 1316 and network 1314, but other techniques might be used as well or instead. In some embodiments, the interface between system 1316 and network 1314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 1316, shown in FIG. 13, implements a web-based customer relationship management (CRM) system. For example, in some embodiments, system 1316 includes application servers configured to implement and execute CRM software applications as well as provide related data, code, forms, web pages and other information to and from user systems 1312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1316 implements applications other than, or in addition to, a CRM application. For example, system 1316 may provide tenant access to multiple hosted (standard and custom) applications. User (or third party developer) applications, which may or may not include CRM, may be supported by the application platform 1318, which manages creation, storage of the applications into one or more database objects and executing of the applications in a virtual machine in the process space of the system 1316.

Each user system 1312 could include a desktop personal computer, workstation, laptop, PDA, cell phone, or any wireless access protocol (WAP) enabled device or any other computing system capable of interfacing directly or indirectly to the Internet or other network connection. User system 1312 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 1312 to access, process and view information, pages and applications available to it from system 1316 over network 1314.

Each user system 1312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1316 or other systems or servers. For example, the user interface device can be used to access data and applications hosted by system 1316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 1312 and all of its components are operator configurable using applications, such as a browser, including computer code run using a central processing unit such as an Intel Pentium® processor or the like. Similarly, system 1316 (and additional instances of an MTS, where more than one is present) and all of their components might be operator configurable using application(s) including computer code to run using a central processing unit such as processor system 1317, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 1316 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 1316 is configured to provide web pages, forms, applications, data and media content to user (client) systems 1312 to support the access by user systems 1312 as tenants of system 1316. As such, system 1316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 14 also shows a block diagram of environment 1310 further illustrating system 1316 and various interconnections, in accordance with some embodiments. FIG. 14 shows that user system 1312 may include processor system 1312A, memory system 1312B, input system 1312C, and output system 1312D. FIG. 14 shows network 1314 and system 1316. FIG. 14 also shows that system 1316 may include tenant data storage 1322, tenant data 1323, system data storage 1324, system data 1325, User Interface (UI) 1430, Application Program Interface (API) 1432, PL/SOQL 1434, save routines 1436, application setup mechanism 1438, applications servers 14001-1400N, system process space 1402, tenant process spaces 1404, tenant management process space 1410, tenant storage area 1412, user storage 1414, and application metadata 1416. In other embodiments, environment 1310 may not have the same elements as those listed above and/or may have other elements instead of, or in addition to, those listed above.

User system 1312, network 1314, system 1316, tenant data storage 1322, and system data storage 1324 were discussed above in FIG. 13. Regarding user system 1312, processor system 1312A may be any combination of processors. Memory system 1312B may be any combination of one or more memory devices, short term, and/or long-term memory. Input system 1312C may be any combination of input devices, such as keyboards, mice, trackballs, scanners, cameras, and/or interfaces to networks. Output system 1312D may be any combination of output devices, such as monitors, printers, and/or interfaces to networks. As shown by FIG. 14, system 1316 may include a network interface 1320 (of FIG. 13) implemented as a set of HTTP application servers 1400, an application platform 1318, tenant data storage 1322, and system data storage 1324. Also shown is system process space 1402, including individual tenant process spaces 1404 and a tenant management process space 1410. Each application server 1400 may be configured to tenant data storage 1322 and the tenant data 1323 therein, and system data storage 1324 and the system data 1325 therein to serve requests of user systems 1312. The tenant data 1323 might be divided into individual tenant storage areas 1412, which can be either a physical arrangement and/or a logical arrangement of data. Within each tenant storage area 1412, user storage 1414 and application metadata 1416 might be similarly allocated for each user. For example, a copy of a user's most recently used (MRU) items might be stored to user storage 1414. Similarly, a copy of MRU items for an entire organization that is a tenant might be stored to tenant storage area 1412. A UI 1430 provides a user interface and an API 1432 provides an application programmer interface to system 1316 resident processes to users and/or developers at user systems 1312. The tenant data and the system data may be stored in various databases, such as Oracle™ databases.

Application platform 1318 includes an application setup mechanism 1438 that supports application developers' creation and management of applications, which may be saved as metadata into tenant data storage 1322 by save routines 1436 for execution by subscribers as tenant process spaces 1404 managed by tenant management process 1410 for example. Invocations to such applications may be coded using PL/SOQL 34 that provides a programming language style interface extension to API 1432. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1416 for the subscriber making the invocation and executing the metadata as an application in a virtual machine.

Each application server 1400 may be communicably coupled to database systems, e.g., having access to system data 1325 and tenant data 1323, via a different network connection. For example, one application server 14001 might be coupled via the network 1314 (e.g., the Internet), another application server 1400N-1 might be coupled via a direct network link, and another application server 1400N might be coupled by yet a different network connection. Transfer Control Protocol and Internet Protocol (TCP/IP) are typical protocols for communicating between application servers 1400 and the database system. However, other transport protocols may be used to optimize the system depending on the network interconnect used.

In certain embodiments, each application server 1400 is configured to handle requests for any user associated with any organization that is a tenant. Because it is desirable to be able to add and remove application servers from the server pool at any time for any reason, there is preferably no server affinity for a user and/or organization to a specific application server 1400. In some embodiments, therefore, an interface system implementing a load balancing function (e.g., an F5 Big-IP load balancer) is communicably coupled between the application servers 1400 and the user systems 1312 to distribute requests to the application servers 1400. In some embodiments, the load balancer uses a least connections algorithm to route user requests to the application servers 1400. Other examples of load balancing algorithms, such as round robin and observed response time, also can be used. For example, in certain embodiments, three consecutive requests from the same user could hit three different application servers 1400, and three requests from different users could hit the same application server 1400. In this manner, system 1316 is multi-tenant, wherein system 1316 handles storage of, and access to, different objects, data and applications across disparate users and organizations.

As an example of storage, one tenant might be a company that employs a sales force where each call center agent uses system 1316 to manage their sales process. Thus, a user might maintain contact data, leads data, customer follow-up data, performance data, goals and progress data, etc., all applicable to that user's personal sales process (e.g., in tenant data storage 1322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1316 might also maintain system level data usable by multiple tenants or other data. Such system level data might include industry reports, news, postings, and the like that are sharable among tenants.

In certain embodiments, user systems 1312 (which may be client machines/systems) communicate with application servers 1400 to request and update system-level and tenant-level data from system 1316 that may require sending one or more queries to tenant data storage 1322 and/or system data storage 1324. System 1316 (e.g., an application server 1400 in system 1316) automatically generates one or more SQL statements (e.g., SQL queries) that are designed to access the desired information. System data storage 1324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method for securing client data using a security server, the method comprising:
  receiving, by a security server, a request to derive a symmetric key from an application server, the request comprising a public key, a salt value, and a key identifier associated with a private key, the public key and private key corresponding to different points on an elliptic curve;
  deriving the symmetric key, by the security server, based on the received public key and the private key associated with the key identifier using a key derivation function, the deriving comprising:
    retrieving the private key associated with the key identifier from a storage location that is not accessible by the application server;
    applying a key agreement protocol to the received public key and the retrieved private key associated with the key identifier, the key agreement protocol outputting a key agreement key by combining the received public key and the retrieved private key to obtain a value on the same elliptic curve as the received public key and the retrieved private key; and applying a key derivation function to the key agreement key to generate the symmetric key by using the obtained value on the same elliptic curve as an input to the key derivation function; and transmitting, by the security server, the derived symmetric key to the requesting application server, the symmetric key being subsequently stored in an in-memory cache of the application server and being used by the application server to encrypt customer data.

2. The method of claim 1, the security server storing a list of asymmetric key pairs for a plurality of tenants, each asymmetric key pair comprising a public key and a private key, each private key being associated with a corresponding key identifier.

3. The method of claim 1, further comprising deleting, by the security server, the derived symmetric key after the transmitting the derived symmetric key to the requesting application server.

4. The method of claim 1, the key agreement protocol generating the key agreement key being based on an elliptic curve common to both the received public key and the retrieved private key associated with the key identifier.

5. The method of claim 1, wherein the key agreement protocol is a Diffie-Hellman key exchange.

6. The method of claim 1, wherein the private key is retrieved from a key management service in communication with the security server, the key management service storing a plurality of private keys accessible by the security server.

7. An apparatus for securing customer data comprising:
one or more processors of a security server; and
a non-transitory computer readable medium storing a plurality of instructions, which when executed, cause the one or more processors to:
receive a request to derive a symmetric key from an application server, the request comprising a public key, a salt value, and a key identifier associated with a private key, the public key and private key corresponding to different points on an elliptic curve;
derive the symmetric key based on the received public key and the private key associated with the key identifier using a key derivation function, the plurality of instructions to derive the symmetric key comprising instructions to:
retrieve the private key associated with the key identifier from a storage location that is not accessible by the application server;
apply a key agreement protocol to the received public key and the retrieved private key associated with the key identifier, the key agreement protocol outputting a key agreement key by combining the received public key and the retrieved private key to obtain a value on the same elliptic curve as the received public key and the retrieved private key; and
apply a key derivation function to the key agreement key to generate the symmetric key by using the obtained value on the same elliptic curve as an input to the key derivation function; and
transmit the derived symmetric key to the requesting application server, the symmetric key being subsequently stored in an in-memory cache of the application server and being used by the application server to encrypt customer data.

8. The apparatus of claim 7, the plurality of instructions further comprising instructions that cause the one or more processors to store a list of asymmetric keys for a plurality of tenants, each asymmetric key pair comprising a public key and a private key, each private key being associated with a corresponding key identifier.

9. He apparatus of claim 7, the plurality of instructions further comprising instructions that cause the one or more processors to delete, by the security server, the derived symmetric key after the transmitting the derived symmetric key to the requesting application server.

10. The apparatus of claim 7, wherein the key agreement protocol generating the key agreement key is based on an elliptic curve common to both the received public key and the retrieved private key associated with the key identifier.

11. The apparatus of claim 7, wherein the key agreement protocol is a Diffie-Hellman key exchange.

12. The apparatus of claim 7, wherein the private key is retrieved from a key management service that stores a plurality of private keys accessible by the security server.

13. A computer program product comprising a non-transitory computer-readable medium having a computer-readable program code embodied therein to be executed by one or more processors, the program code including instructions to:
receive a request to derive a symmetric key from an application server, the request comprising a public key, a salt value, and a key identifier associated with a private key, the public key and private key corresponding to different points on an elliptic curve;
derive the symmetric key based on the received public key and the private key using a key derivation function, the instructions to derive the symmetric key comprising instructions to:
retrieve the private key from a storage location that is not accessible by the application server;
apply a key agreement protocol to the received public key and the retrieved private key, the key agreement protocol outputting a key agreement key by combining the received public key and the retrieved private key to obtain a value on the same elliptic curve as the received public key and the retrieved private key; and
apply a key derivation function to the key agreement key to generate the symmetric key by using the obtained value on the same elliptic curve as an input to the key derivation function; and
transmit the derived symmetric key to the requesting application server, the symmetric key being subsequently stored in an in-memory cache of the application server and being used by the application server to encrypt customer data stored on the application server.

14. The computer program product of claim 13, further comprising instructions to store a list of asymmetric keys for a plurality of tenants, the application server being associated with one of the plurality of tenants, each symmetric key in the list being associated with a public key accessible to a tenant and a private key accessible by the security server and not accessible by the plurality of tenants.

15. The computer program product of claim 13, further comprising instructions to delete the derived symmetric key after the transmitting the derived symmetric key to the requesting application server.

16. The computer program product of claim 13, wherein the key agreement protocol generating the key agreement key is based on an elliptic curve common to both the received public key and the retrieved private key associated with the key identifier.

17. The computer program product of claim 13, wherein the key agreement protocol is a Diffie-Hellman key exchange.

18. The computer program product of claim 13, wherein the private key is retrieved from a key management service in communication with the security server, the key server comprising a hardware security module (HSM) that stores a plurality of private keys linked to a plurality of public keys provided to the security server.

* * * * *